United States Patent

[11] 3,614,169

| [72] | Inventor | Richard C. Bueler<br>Glendale, Mo. |
|---|---|---|
| [21] | Appl. No. | 22,904 |
| [22] | Filed | Mar. 26, 1970 |
| [45] | Patented | Oct. 19, 1971 |
| [73] | Assignee | Wagner Electric Corporation<br>Newark, N.J. |

[54] CONTROL VALVE
7 Claims, 3 Drawing Figs.

[52] U.S. Cl. ..................................................... 303/6 C,
60/54.5 E, 188/151 A, 188/349, 200/82 D, 303/84
A, 340/52 C
[51] Int. Cl. ..................................................... B60t 8/26,
B60t 15/00, B60t 17/22
[50] Field of Search ............................................ 303/6 C,
84, 84 A; 200/82 R, 82 D; 340/52 C; 188/151 A,
345, 349; 60/54.5 E

[56] References Cited
UNITED STATES PATENTS

| 3,469,889 | 9/1969 | Bueler | 303/6 C |
| 3,480,333 | 11/1969 | Stelzer | 303/6 C |
| 3,498,681 | 3/1970 | Bueler | 303/6 C |
| 3,532,390 | 10/1970 | Bueler | 303/6 C |
| 3,556,607 | 1/1971 | Shutt et al. | 303/6 C |

*Primary Examiner*—Milton Buchler
*Assistant Examiner*—John J. McLaughlin
*Attorney*—Joseph E. Papin ABSTRACT: A control valve for use in a dual or split brake system having a shuttle or warning piston movable from a centered position to opposed translated positions to energize a driver-warning lamp in response to a predetermined differential between separate supplied fluid pressures acting thereon. A divider member is provided in the control valve defining a flow passage therethrough for one of the supplied fluid pressures, and a proportioning valve is movable in said flow passage to control the application therethrough of the one supplied fluid pressure. A bypass passage for subjection to the one supplied fluid pressure is also provided in the divider member connected with the flow passage in bypass relation with the proportioning valve, and a valve member is normally urged into engagement with the divider member closing the bypass passage. A lost motion connection is provided between the valve member and the shuttle piston wherein said valve member is moved to a position opening the bypass passage upon the movement of said shuttle piston to one of its translated positions.

PATENTED OCT 19 1971
3,614,169
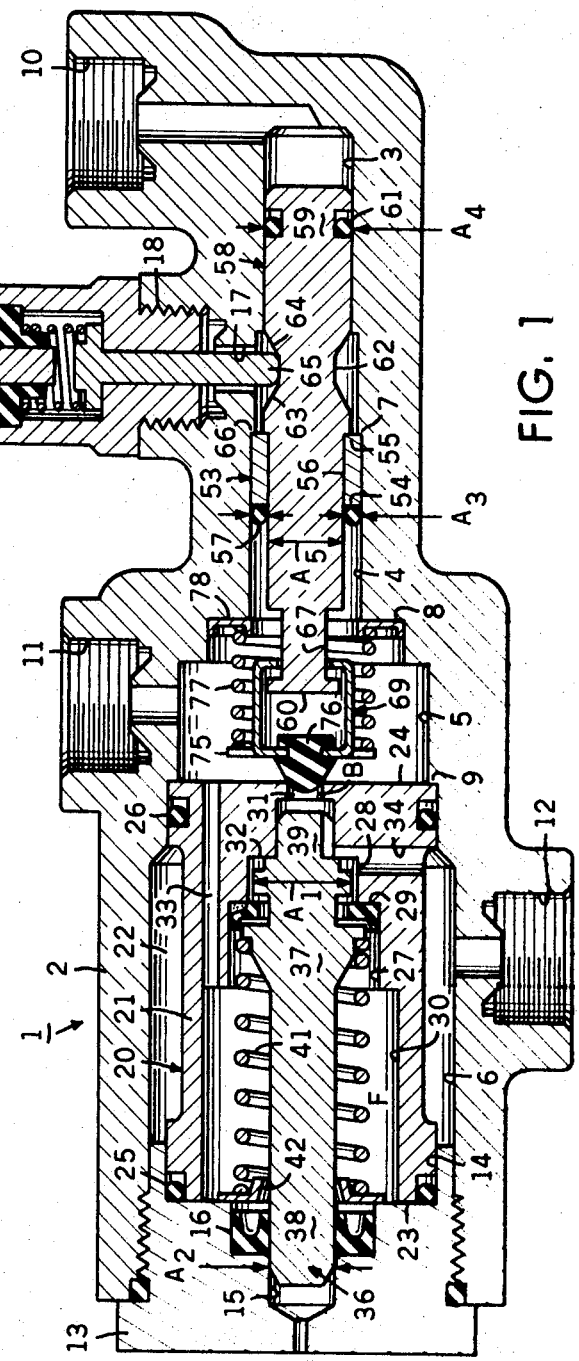
FIG. 1
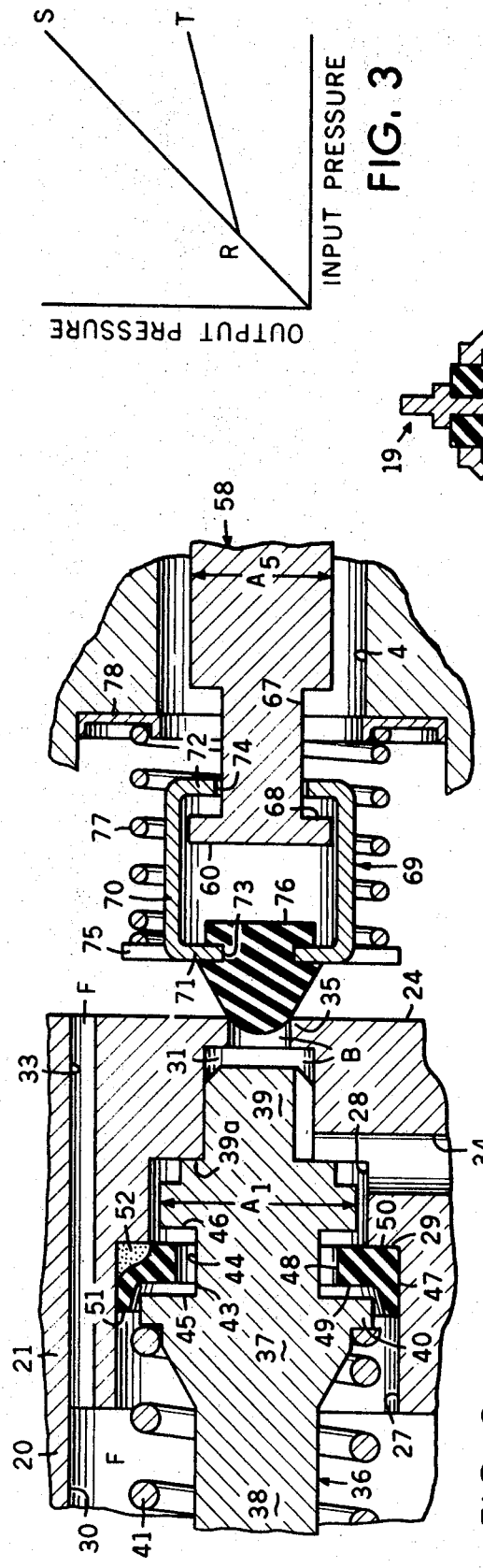
FIG. 2
FIG. 3
INVENTOR
RICHARD C. BUELER
BY
Joseph E. Papin

CONTROL VALVE

This invention relates to dual fluid pressure systems in general and in particular to a combination warning, bypass and proportioning valve for controlling pressure fluid flow through one of said systems.

SUMMARY OF THE INVENTION

In the past warning, bypass and proportioning control valves employed in a split hydraulic brake system with a split system master cylinder, a divider member, in which the proportioning piston was movable, had been utilized not only to simplify the porting of such control valve but also for the main purpose of providing in-line construction or movement for both the warning and proportioning pistons. A bypass passage was provided in the divider member for shunting or bypassing one of the supplied fluid pressures around the proportioning piston to obviate the proportioning effect thereof on the one supplied fluid pressure in the event of the failure of the other of the supplied fluid pressures. The bypass passage was normally closed by one end of the warning piston having an O-ring seal thereon slidable in said bypass passage and sealably engaged with the divider member. One of the disadvantageous or undesirable features of such past constructions was the possibility of the destruction or cutting of the O-ring seal upon the engagement thereof with the relatively sharp edges about the entry of said bypass passage into said divider member when the warning piston was shuttled between its centered and translated positions to open and close said bypass passage. Another disadvantageous or undesirable features of such past constructions which accentuated the foregoing disadvantageous feature was a concentricity problem effected by the guiding of the warning piston in one bore of the control valve while the aforementioned one end of said warning piston was slidable and guidable in the bypass passage of the divider member. Still another disadvantageous or undesirable feature of such past constructions was that at least a portion of the warning piston, or a centering piston if employed therewith, was subjected to the proportioned fluid pressure as established upon actuation of the proportioning piston. This, of course, created a design problem affecting the opposed areas of the warning piston in order to maintain the translating fluid pressure differential substantially of the same magnitude in the opposite translating directions of said warning pistons.

The principal object of the present invention is to provide a combination control valve which overcomes the aforementioned disadvantageous or undesirable features, as well as others; and this, as well as other objects and advantageous features of the present invention, will become apparent hereinafter.

Briefly, the invention comprises a control valve having a housing, means for comparing the magnitudes of separate fluid pressures supplied to said housing and movable from a centered position toward opposed translated positions in response to a predetermined differential between the supplied fluid pressures, divider means defining a flow passage through said housing for one of the supplied fluid pressures, metering means controlling said flow passage and operable to establish a metered applied fluid pressure therethrough, a bypass passage in said divider means for subjection to the one supplied fluid pressure and connected with said flow passage in bypass relation with said metering means, and valve means normally closing said bypass passage means including means for concertedly moving said valve means to a position opening said bypass passage upon the movement of said first named means to one of its translated positions.

RELATED PATENTS

This patent application is related to U.S. Pat. No. 3,464,741 issued to Edward J. Falk on Sept. 2, 1969, U.S. Pats. Nos. 3,448,230 and 3,450,433 issued to Richard C. Bueler on June 3, 1969, and June 17, 1969, respectively, and U.S. Pat. application Ser. No. 861,358 filed Sept. 26, 1969, by Stanley L. Stokes, said patents and application being assigned to the common assignee of this patent application which is a patentably distinct improvement.

DRAWING DESCRIPTION

In the drawings wherein like numerals refer to like parts wherever they occur:

FIG. 1 is a sectional view illustrating a control valve embodying the present invention in cross section;

FIG. 2 is an enlarged fragmentary view taken from FIG. 1; and

FIG. 3 is a graphical representation of the applied or output fluid pressure effected by the proportioning valve of FIG. 1 in response to the supplied or input fluid pressure.

Referring now to the drawings in detail and in particular to FIG. 1, a control valve 1 is provided with a housing 2 having a bore 3 therein in axial alignment with stepped counterbores 4, 5 and 6, and shoulders 7, 8 and 9 are provided on said housing between the bore and counterbore 3, 4, the counterbores 4, 5 and the counterbores 5, 6, respectively. Inlet and outlet ports 10, 11, which are adapted for connection with the separate fluid-pressure-generating chambers of a split system master cylinder (not shown), are provided in the housing 2 intersecting with the bore 3 adjacent to its rightward end and with the counterbore 5 adjacent to its midportion, respectively, and an outlet port 12, which is adapted for connection with the vehicle rear brakes (not shown), is also provided in said housing intersecting with the counterbore 6 adjacent to its midportion. A closure member or end plug 13 is threadedly received in the leftward or open end of the counterbore 6 having a pair of stepped guide bores 14, 15 therein, and a seal 16 is also provided in said closure member about the smaller stepped guide bore 15. A cross-bore 17 is also provided in the housing 2 having one end intersecting with the bore 3 adjacent to the shoulder 7 and the other end thereof connecting with a cross-counterbore 18 which is threaded at its open end to receive an electrical switch 19, to be discussed hereinafter.

Referring now to FIGS. 1 and 2, a sleeve or divider member 20 is provided with a sleeve or body portion 21 which extends coaxially through the housing counterbore 6, and a peripheral or annular chamber 22 is defined between said housing counterbore and divider body connected in open pressure fluid communication with the outlet port 12 at all times. The divider body 21 is provided with opposed end portions 23, 24 in abutting engagement between the closure member 13 and the housing shoulder 9, and peripheral seals 25, 26 are carried in said divider body adjacent to said opposed end portions in sealing engagement with the closure member stepped bore 14 and the housing counterbore 6. Stepped bores 27, 28, having a shoulder 29 therebetween, are coaxially provided in the divider body 21 interconnecting between a counterbore 30 and a passage 31 which intersect with the body opposed ends 23, 24, respectively, said stepped bore 28 and passages 30 having a shoulder 32 therebetween. An axial passage 33 is provided in the divider body 21 having one end connecting with the divider body counterbore 30 and the other end thereof intersecting with the divider body rightward end 24, and a cross or connecting passage 34 is also provided in the divider body 21 connecting between the stepped bore 28 and the annular chamber 22. It should be noted that the axial passage 33, the counterbore 30, the stepped bores 27, 28, and the cross-passage 34 in the divider body 21 define a flow passage, indicated generally at F, which is connected to the inlet port 11 through the housing counterbore 5 and to the outlet port 12 through the annular chamber 22, and it should also be noted that the passage 31 defines a bypass passage, indicated generally at B, which is connected in parallel, shunting or bypass relation with the flow passage F being connected with the inlet port 11 through the housing counterbore 5 and with the outlet port 12 through said flow passage. To complete the description of the divider member 20, a valve seat 35 is provided on the body rightward end portion 23 about the passage 30.

A metering or proportioning member, such as the piston indicated generally at 36, is provided with a head portion 37 integrally formed between opposed reduced extensions or stem portions 38, 39, and a shoulder or abutment 39a is provided on said proportioning member between the head 37 and extension 39. The head 37 is provided with a plurality of radially extending guides 40, and a proportioning or metering spring 41 is precompressed between said guides and a retainer 42 to respectively urge said retainer into engagement with the closure member 13 and the proportioning piston abutment 39a into abutting engagement with the divider body shoulder 32. An annular peripheral groove 43 is provided in the proportioning piston head 37 having a base wall 44 interposed between opposed, radially extending sidewalls 45, 46, said side wall 46 defining a valve member for engagement with an annular sealing or seating member 47. The sealing member 47 is provided with a centrally located aperture 48 therethrough and interposed between opposed sides 49, 50. The seal side 50 is normally seated in abutment with the divider body shoulder 29 and also defines a valve seat about said aperture for engagement with the valve member or groove sidewall 46. The seal 47 is also provided with an annular peripheral lip 51 in sealing engagement with the divider stepped bore 27, and a plurality of radially extending return flow passages 52 are provided between the seal side 50 and lip 51, said return flow passages being normally closed by the sealing engagement of said seal lip with said divider body stepped bore. The proportioning piston leftward extension 38 extends coaxially through the divider body counterbore 30 and the closure member seal 16 in sealing engagement therewith into sliding engagement with the closure member stepped bore 15. It should also be noticed that the sealing engagement of the proportioning piston valve member 46 with the sealing member valve seat 50, as discussed hereinafter, defines an effective area $A_1$ on the proportioning piston 36 which is subjected to the fluid pressure at the outlet port 12 at all times, and another effective area $A_2$ is provided by the sealing engagement of the proportioning piston extension 38 with the closure member seal 16 and subjected to the atmosphere in the closure member bore 14 at all times, said area $A_1$ being opposed to and predeterminately greater than the area $A_2$.

A centering member or piston, indicated generally at 53, is slidably received in the housing counterbore 4 having opposed ends or abutment surfaces 54, 55, and an axially extending bore 56 is provided through said centering piston between said opposed ends thereof. A seal, such as the O-ring 57, is sealably engaged between the housing counterbore 4 and the leftward end 54 of the centering piston 53, and the rightward opposed end 55 thereof is normally engaged with the housing shoulder 7, said O-ring seal and leftward end of said centering piston defining an annular effective area $A_3$ subjected to the fluid pressure at the inlet port 11 at all times.

A reciprocal switch-actuating member or piston, indicated generally at 58, is shown in its centered or normal operating position in the housing 2 having opposed extension or end portions 59, 60 thereon. The switch piston end portion 59 is slidably received in the housing bore 3, and a peripheral seal 61 is carried on said switch piston end portion in sealing engagement with said housing bore. The sealing engagement of the seal 61 with the housing bore 3 defines an effective cross-sectional area $A_4$ on the end portion 59 which is subjected to the fluid pressure at the inlet port 10 at all times. A groove 62 is provided in the switch piston 58 adjacent to the midportion thereof having opposed sidewalls defining cam surfaces 63, 64 for driving engagement with a switch-operating member 65 of the electrical switch 18 upon translatory movement of the switch piston, as discussed hereinafter. The switch-operating member 65 is movable between an inoperative or circuit-breaking position, as shown, and an operative or circuit-making position displaced upwardly in the bore 3, as discussed hereinafter, for completing an electrical circuit to energize a driver warning or dash lamp (not shown), as well known in the art. The switch piston 58 is slidably received in the centering piston bore 56 and extends through the O-ring seal 57 in sealing engagement therewith, and an annular shoulder or abutment 66 is provided on said switch piston for driving or centering engagement with the rightward end 55 of the centering piston 53. The sealing engagement of the switch piston 58 with the O-ring seal 57 defines another effective cross-sectional area $A_5$ which is subjected to the fluid pressure at the inlet port 11 at all times and additive to the area $A_4$. The additive areas $A_4$, $A_5$ are greater than the area $A_3$, and the area $A_3$ is greater than the area $A_5$. An annular groove 67 is provided in the switch piston 58 adjacent to the leftward end 60 thereof having a sidewall 68 which defines a lost motion connection with a bypass valve assembly or cage, indicated generally at 69.

The bypass valve assembly 69 is provided with an annular sleeve portion 70 having integrally formed opposed end walls 71, 72 extending radially inwardly therefrom, and apertures 73, 74 are provided through said end walls, respectively. The sleeve 70 is also provided with radially extending tabs or retainers 75, and a resilient insert or valve member 76 is provided on the sleeve end wall 71 extending through the aperture 73 in displacement preventing engagement therewith. A valve spring 77 is engaged between an annular retainer 78 and the sleeve tabs 75 urging the valve element 76 into sealing engagement with the divider valve seat 35 and urging said retainer into engagement with the housing shoulder 8. The leftward end 60 of the switch piston 58 extends coaxially through the sleeve aperture 74, and the groove sidewall 68 of said switch piston is predeterminately spaced from the sleeve end wall 72 to provide a lost motion driving connection therebetween when said switch piston is in its centered position, as shown.

In the operation with the component parts of the control valve 1 positioned as shown in the drawings and as described hereinafter, separately supplied or input fluid pressures $P_1$, $P_2$ normally having substantially equal magnitudes are transmitted upon actuation of the split system master cylinder (not shown) to the inlet ports 10, 11, respectively, of the control valve 1. The input fluid pressure $P_1$ flows from the inlet port 10 into the housing bore 3 acting on the switch piston area $A_4$ to establish a force $P_1 A_4$, and the input fluid pressure $P_2$ flows from the inlet port 11 into the housing counterbores 4, 5 acting on the centering piston area $A_3$ to establish a force $P_2 A_3$ in opposition to the force $P_1 A_4$ and urging said centering piston toward engagement with the housing shoulder 7 and the switch piston abutment 66. The input fluid pressure $P_2$ also acts on the effective area $A_5$ of the switch piston 58 to establish a force $P_2 A_5$ in opposition to the force $P_1 A_4$. Since the sum of the areas $A_3$, $A_5$ is greater than the area $A_4$, as mentioned hereinbefore, the additive forces $P_2 A_5$, $P_2 A_3$ are greater than the opposing force $P_1 A_4$ to normally obviate leftward translatory movement of the switch piston 58 from its centered position. Further, since the force $P_2 A_3$ urges the centering piston 58 into engagement with the housing shoulder 7, it is also apparent that the force $P_1 A_4$ is greater than the force $P_2 A_5$ to normally oppose rightward translatory movement of the switch piston 58 from its centered position since the area $A_4$ is greater than the area $A_5$.

The fluid pressure $P_2$ also flows from the housing counterbore 5 through the divider body connecting passage 33, the counterbore 30, the annular groove 43 of the proportioning piston 36 and the divider body stepped bore 28 and connecting passage 34 into the annular chamber 22 to establish an applied or output fluid pressure Po at the outlet port 12. The input fluid pressure $P_2$ acts on the input effective area $A_1 - A_2$ of the proportioning piston 36 to establish an input force $P_2 (A_1 - A_2)$, and the output fluid pressure Po acts on the output effective area $A_1$ of said proportioning piston to establish an output force Po $A_1$ opposed to the input force $P_2 (A_1 - A_2)$. Since the input and output fluid pressures $P_2$, Po are initially equal throughout the range OR, as shown on the line ORS in the graph of FIG. 3, and since the output area $A_1$ is greater than the input area $A_1 - A_2$ of the proportioning piston 36, it is obvious that the output force Po $A_1$ is greater than the input force $P_2$ ($A_1-A_2$); however, the compressive force Fc of the metering spring 41 is additive to the input force $P_2$ ($A_1-A_2$) and thereby movement of the proportioning piston 36 is prevented until the input and output fluid pressures $P_2$, Po exceed the predetermined value R, as shown on the line OR in the graph of FIG. 3. When the predetermined value R of the input and output fluid pressures $P_2$, Po is attained, the output force Po $A_1$ overcomes the additive input and spring forces $P_2$ ($A_1-A_2$), Fc to move the proportioning piston 36 from its normal position in a leftward direction toward an operating or isolating position against the compressive force Fc of the metering spring 41. This leftward movement of the proportioning piston 36 initially moves the valve member 46 thereof into lapped engagement with the rightward face or seal 50 of the sealing member 47 to interrupt pressure fluid communication between the inlet and outlet ports 11, 12 through the flow passage F and isolate the input fluid pressure $P_2$ from the output fluid pressure Po.

It is obvious that the increases in the magnitude of the input fluid pressure $P_2$ in excess of the predetermined value R, as illustrated by the line RS in the graph of FIG. 3, will result in proportionally reduced or metered increases in the output fluid pressure Po, as illustrated by the line RT. For instance, when the input fluid pressure $P_2$ is further increased to a value in excess of the predetermined value R, the input force $P_2$ ($A_1-A_2$) is correspondingly increased and additive to the spring force Fc to overcome the output force Po $A_1$; therefore, the proportioning piston 36 is moved rightwardly toward a metering position disengaging the proportioning piston valve member 46 from the sealing member seat 50 to effect a metered application of the increased fluid pressure $P_2$ through the proportioning piston groove 43 into the divider member stepped bore 28 and connecting passage 34 and therefrom through the annular chamber 22 to the outlet port 12 to effect a proportional or ratioed increase in the output fluid pressure Po, as shown by the line RT in the graph of FIG. 3 wherein Po=$P_2(A-A_2)$+Fc/$A_1$. Of course, the increased output fluid pressure Po in excess of the predetermined value R effects a corresponding increase in the output force Po $A_1$, and when the increased output force Po $A_1$ attains an increased value substantially equal to the additive input force and spring forces $P_2$ ($A_1-A_2$), Fc, the proportioning piston 36 is again moved leftwardly to reposition the valve member 46 thereof in lapped engagement with the sealing member seat 50 closing the proportioning piston groove 43 to again isolate the input and output fluid pressures $P_2$, Po. It is, of course, obvious that the proportioning piston 36 will be responsive to further increases in the input fluid pressure $P_2$ to effect further proportional increases in the output fluid pressure Po in the same manner as previously described. Since the input fluid pressure $P_2$ is greater than the proportioned output fluid pressure Po, this differential acts across the bypass valve member 69 urging it toward seating engagement with the divider body valve seat 35 to maintain the bypass passage 30 closed.

When the split system master cylinder is deactuated, the input fluid pressures $P_1$, $P_2$ are vented to atmosphere which eliminates the forces $P_1$ $A_3$, $P_2$ $A_4$ and $P_2$ $A_5$ acting on the centering and switch pistons 53, 58, as well as the input force $P_2$ ($A_1-A_2$) acting on the proportioning piston 36. Upon elimination of the input fluid pressure $P_2$, the output fluid pressure Po acting on the sealing member 47 displaces the lip 51 thereof from sealing engagement with the divider body stepped bore 27, and in this manner the applied or output fluid pressure Po returns from the outlet port 12 through the annular chamber 22, the connecting passage 34 and the divider body stepped bore 28, the return flow passages 53 in the sealing member, and between the displaced lip thereof and said divider body stepped bore 27 and passage 33 into the housing counterbore 5 to the inlet port 11. When the output fluid pressure Po is so reduced to correspondingly reduce the output force Po $A_1$ to a value less than that of the metering spring force Fc, the metering spring 41 moves the proportioning piston 36 rightwardly to its original position with the abutment 39a thereof in engagement with the divider body shoulder 32 displacing the proportioning piston valve member 46 from the sealing member seat 50 and thereby opening the proportioning piston groove 43 to again establish open pressure fluid communication between the inlet and outlet ports 11, 12 through the flow passage F and effect complete elimination of the output fluid pressure Po.

In the event of the failure of the input fluid pressure $P_1$ due to a malfunction of the split system master cylinder or other leaks or the like, it is, of course, desirable to obviate the metering function of the proportioning valve 36 and effect the application of the input fluid pressure $P_2$ through the bypass passage B to establish an unaltered or unmetered output or applied fluid pressure Po at the outlet port 12 to utilize the maximum available fluid pressure for energizing the vehicle brake set connected with said outlet port under such emergency conditions; therefore, when the magnitude of the supplied fluid pressure $P_2$ exceeds that of the failed input fluid pressure $P_1$ by a predetermined value, the force $P_2$ $A_5$ acting on the switch piston 58 will displace said switch piston rightwardly toward its rightward displaced or translated position engaging the switch piston end portion 59 with the end wall of the housing stepped bore 3 since the force $P_1$ $A_4$ normally opposing such translatory movement is eliminated upon the failure of the input fluid pressure $P_1$. This rightward translatory movement of the switch piston 58 also moves the leftward end portion 60 thereof toward a displaced or translated position initially moving the driving shoulder 68 thereof through the lost motion connection into driving engagement with the end wall 72 of the sleeve 70 and thereafter concertedly moving the valve member cage 69 rightwardly against the negligible force of the valve spring 77 toward an open or translated position in the housing counterbore 5 disengaging the valve member 76 from the divider member valve seat 35 to open bypass passage B. In this manner, the input fluid pressure $P_2$ flows from the inlet port 11 through the housing counterbore 5, the divider body passages 30, 34 into the annular chamber 22 to the outlet port 12 in bypass relation with the proportioning piston 36 to obviate metering or proportioning actuation thereof, and it is, of course, obvious that the bypassed output or applied fluid pressure Po so established at the outlet port 12 is equal to the input fluid pressure $P_1$ at the inlet port 11 when the bypass passage B is open to effect the application of the maximum available fluid pressure to the vehicle brake set connected with said outlet port under the emergency conditions. Further, the rightward translatory movement of the switch piston 58 also moves the cam surface 63 thereof rightwardly toward a position driving the switch-operating member 65 upwardly toward an operative or circuit-making position for energizing the driver warning or dash lamp (not shown).

The control valve 1 functions in substantially the same manner to complete the electrical circuit for energizing the driver warning or dash lamp in the event of the alternative failure of the supplied fluid pressure $P_2$. Failure of the fluid pressure $P_2$ eliminates the forces $P_2$ $A_4$, $P_2$ $A_5$ acting on the centering and switch pistons 53, 58 wherein the force of the supplied fluid pressure $P_1$ acting on the switch piston area $A_4$ effects the leftward translatory movement of the switch piston 58 to engage the end 60 of said switch piston with the valve member 76 in its sealing position with the divider body valve seat 35, and the driving engagement of the switch piston shoulder 66 with the centering piston end 55 serves to concertedly move the centering piston 53 with the switch piston 58 to its leftward translated position. During the leftward translatory movement of the switch piston 58, the cam surface 64 thereof drivingly engages the switch member 65 to effect the upward movement thereof for completing the electrical circuit and energizing the driver-warning dash lamp, as previously described.

The embodiments of the invention in which an exclusive property or privilege is claimed are defined as follows:

1. A control valve comprising a housing, indicator piston means subjected to separate fluid pressures supplied to said housing and movable from a normally centered position toward one of opposed translated positions in response to one of the supplied fluid pressures acting thereon upon the failure of the other of the supplied fluid pressures, divider means defining with said housing a pressure fluid flow passage therethrough for said one supplied fluid pressure, proportioning piston means movable in said divider means for effecting a proportional application through said flow passage of the one supplied fluid pressure, a bypass passage in said divider means for the one supplied fluid pressure and connected with said flow passage in bypass relation with said proportioning piston means, and valve means normally urged toward a position engaged with said divider means to close said bypass passage and defining a lost motion driving connection with said indicator piston means in its centered position, said indicator piston means being initially movable to its one translated position relative to said valve means through the lost motion connection into driving engagement with said valve means and being thereafter further movable to concertedly move said valve means to a position engaged from said divider means opening said bypass passage to the one supplied fluid pressure and obviating the proportioning actuation of said proportioning piston means.

2. A control valve according to claim 1, comprising a valve seat on said divider means about said bypass passage, said valve means being urged into engagement with said valve seat to close said bypass passage when said indicator piston means is in its centered position and being disengaged from said valve seat upon the movement of said indicator piston means to its one translated position.

3. A control valve according to claim 1, comprising a valve spring engaged with said valve means normally urging said valve means toward its position closing said bypass passage, said valve means being movable to its open position against said valve spring.

4. A control valve according to claim 1, comprising a valve seat on said divider means about said bypass passage, and spring means engaged between said valve means and said housing urging said valve means into engagement with said valve seat to close said bypass passage when said indicator piston means is in its centered position, said valve means being movable against said spring means and disengaged from said valve seat to open said bypass passage upon the movement of said indicator piston means to its one translated position.

5. A control valve according to claim 4, wherein said valve means includes an annular sleeve member, opposed end walls on said sleeve member extending radially inwardly thereof, a pair of aperture means in said end walls, a valve element for engagement with said valve seat extending through one of said apertures in displacement preventing engagement with one of said end walls, and tab means on said sleeve member engaged with said valve spring, said valve spring normally urging said valve element into engagement with said valve seat, extension means on said indicator piston means extending through the other of said aperture means coaxially into said sleeve member, and an abutment on said extension means for engagement with the other of said end walls and normally spaced therefrom defining the lost motion connection when said indicator piston means is in its centered position, said abutment means being initially movable through the lost motion connection relative to said other end wall into driving engagement therewith and being thereafter further movable to concertedly move said valve means against said spring means to disengage said valve element from said valve seat and open said bypass passage upon the movement of said indicator piston means to its one translated position.

6. A control valve according to claim 1, comprising a pair of abutment means on said valve means and said indicator piston means, respectively, and spaced from each other to define the lost motion connection when said indicator piston means is in its centered position, one of said abutment means on said indicator piston means being initially movable relative to the other of said abutment means on said valve means into driving engagement therewith and being thereafter further movable to disengage said valve means from said divider means opening said bypass passage upon the movement of said indicator piston means to its one translated position.

7. A control valve comprising a housing, means for comparing the magnitudes of separate fluid pressures supplied to said housing and movable therein from a normally centered position toward opposed translated positions in response to oppositely acting differentials in excess of a predetermined amount between the magnitudes of the separate supplied fluid pressures acting thereon, other means in said housing and defining therewith a pressure fluid flow passage through said housing for one of the supplied fluid pressures, proportioning means movable in said other means and being substantially coaxial with said first named means for controlling the application through said flow passage of the one supplied fluid pressure, said proportioning means being initially movable in response to the one supplied and applied fluid pressures of a predetermined value toward a position in said flow passage isolating the one supplied and applied fluid pressures and being thereafter further movable in response to increases in the one supplied fluid pressure in excess of the predetermined value toward a metering position effecting a metered increase in the one applied fluid pressure in a predetermined ratio with the increased one supplied fluid pressure, a bypass passage in said other means connected in bypass relation with said flow passage around said proportioning means, valve means movable in said housing for controlling said bypass passage, resilient means normally urging said valve means toward a position closing said bypass passage means, and said valve means including means defining a lost motion connection with said first named means in its centered position, said first named means being movable from its centered position in response to the one supplied fluid pressure acting thereon upon the failure of the other of the supplied fluid pressures toward one of its opposed translated positions to effect said lost motion connection and thereafter concertedly move said valve means toward a position opening said bypass passage to the one supplied fluid pressure and obviating the metering function of said other means.